(12) United States Patent
Joss

(10) Patent No.: US 7,769,661 B1
(45) Date of Patent: Aug. 3, 2010

(54) CONDITIONAL PROBABILITY METHOD FOR STOCK OPTION VALUATION

(76) Inventor: Richard R. Joss, 5620 Southwick St., Bethesda, MD (US) 20817

( * ) Notice: Subject to any disclaimer, the term of this patent is extended or adjusted under 35 U.S.C. 154(b) by 685 days.

(21) Appl. No.: 11/426,349

(22) Filed: Jun. 26, 2006

(51) Int. Cl.
*G06F 17/60* (2006.01)

(52) U.S. Cl. .......... 705/36 R; 705/35; 705/34; 463/9; 463/1; 463/42; 463/22; 273/278; 273/274; 273/256; 434/107

(58) Field of Classification Search .......... 434/107
See application file for complete search history.

(56) References Cited

U.S. PATENT DOCUMENTS

| | | | |
|---|---|---|---|
| 4,566,066 A | 1/1986 | Towers | |
| 5,761,442 A | 6/1998 | Barr | |
| 5,812,988 A | 9/1998 | Sandretto | |
| 5,819,238 A | 10/1998 | Fernholz | |
| 5,978,778 A | 11/1999 | O'Shaughnessy | |
| 6,035,286 A | 3/2000 | Fried | |
| 6,061,662 A | 5/2000 | Makivic | |
| 6,125,355 A | 9/2000 | Bekaert | |
| 6,269,346 B1 | 7/2001 | Cristofich | |
| 6,304,858 B1 | 10/2001 | Mosler | |
| 6,453,303 B1* | 9/2002 | Li | 705/36 R |
| 6,556,992 B1 | 4/2003 | Barney | |
| 6,709,330 B1* | 3/2004 | Klein et al. | 463/9 |
| 7,315,842 B1* | 1/2008 | Wang | 705/38 |
| 7,401,042 B1* | 7/2008 | Pisani | 705/36 R |
| 7,509,275 B2* | 3/2009 | Glinberg et al. | 705/35 |
| 2001/0056398 A1* | 12/2001 | Scheirer | 705/38 |
| 2002/0165810 A1* | 11/2002 | Evertsz et al. | 705/36 |
| 2003/0018456 A1* | 1/2003 | Browne et al. | 703/2 |
| 2004/0215545 A1* | 10/2004 | Murakami et al. | 705/36 |
| 2006/0036531 A1* | 2/2006 | Jackson et al. | 705/37 |
| 2006/0259381 A1* | 11/2006 | Gershon | 705/35 |

OTHER PUBLICATIONS

"Estimating Daily Volatility in financial markets utilizing intraday data" by Bernard Bollen et al.; Department of Accounting and Finance, Monash University, Clayton 3168, Australia at www.sciencedirect.com/-Journal of Emperical Finance Jul. 2002—19 pages.*

(Continued)

*Primary Examiner*—James P Trammell
*Assistant Examiner*—Mary Gregg
(74) *Attorney, Agent, or Firm*—Plumsea Law Group, LLC

(57) ABSTRACT

A method, system, and computer program product for determining stock option pricing in which the interplay of short-term interest rates and expected long-term rates of return on the underlying security results are factored to yield a more accurate forecast of options prices as compared to conventional models. The method of the present invention employs an expected long-term rate of return parameter and a conditional probability volatility parameter and an adjustment factor to address the put-call parity theorem which addresses the accuracy problems of the Black-Scholes model. The method can also be applied using a known current option prices to determine an assumed long-term rate of return.

10 Claims, 14 Drawing Sheets

OTHER PUBLICATIONS

"The volatility of short-term interest rates" by Nowak L Stone: Mar. 22, 1991 at www.allbusiness.com/business-finance/business-loans-interest-rate/160209-1.html 5 pages.*

"Money and Capital Markets" by Michael Sherris pages at http://books.google.com/books?id=s65JwHjZy5AC (5 of 5)Mar. 26, 2009 1:18:12 PM—7 pages.*

Continuous compounding, Volatility and the equity Premium by Richard Fitzherbert: 2002 45 pages.*

Bulow, Jeremy & Shoven, John B., Accounting for Stock Options [online], Apr. 2, 2004 [retrieved on Oct. 1, 2009]. Retrieved from the Internet<URL:https://gsbapps.stanford.edu/researchpapers/library/RP1848%28R%29.pdf>.

Bjork, Tomas, Black-Scholes [online] [retrieved on Oct. 1, 2001]. Retrieved from the Internet:<URL:http://pascal.iseg.ult.pt/~stochfin2004/TBIII.pdf>.

How Do Stock Options Work? [online] [retrieved on Oct. 1, 2009]. Retrieved from the Internet:<URL:http://money.howstuffworks.com/personal-finance/financial-planning/stock-options.htm/printable>.

Hull, John & White, Alan, How to Value Employee Stock Options [online], Sep. 2002 [retrieved on Oct. 1, 2009]. Retrieved from the Internet<URL:http://www.rotman.utoronto.ca/~hull/DownloadablePublications/esoppaper.pdf>.

Frederick W. Cook & Co., Inc., Forces to Overthrow Stock Option Accounting Gaining Strength [online], Mar. 4, 2002 [retrieved on Oct. 1, 2009]. Retrieved from the Internet<URL:http://www.fwcook.com/alert_letters/3-4-02ForcesToOverthrowStkOpt...%20%281%29.pdf>.

Knoll, Michael S., Put-Call Parity and the Law [online], Nov. 26, 2002 [retrieved Oct. 1, 2009]. Retrieved from the Internet:<URL:http://www.law.upenn.edu/cf/faculty/mknoll/workingpapers/24CardozoLR61.pdf>.

* cited by examiner

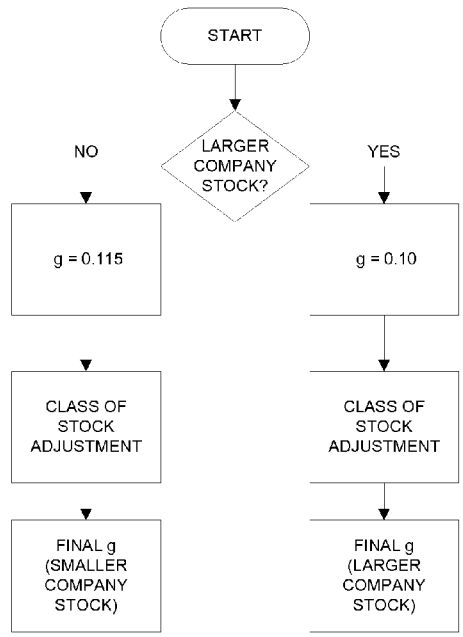
FIG. 2A
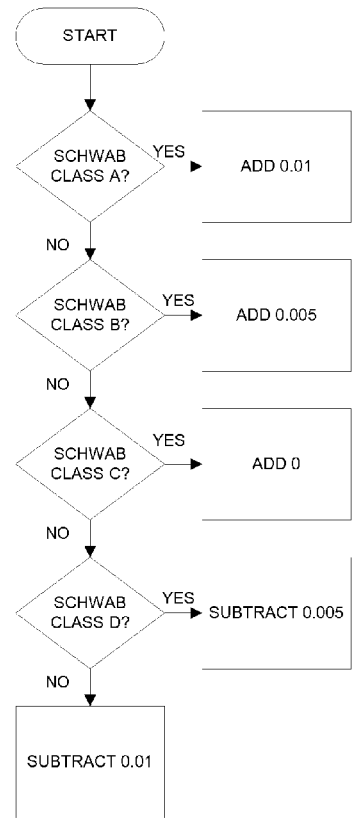
FIG. 2C
| Investment Ratings | | | |
|---|---|---|---|
| Schwab Equity Rating | Distribution of Rating | 12 Month Return Outlook | General Buy/Hold/Sell Guidance |
| A | Top 10% of stocks rated | Strongly Outperform | Buy |
| B | Next 20% | Outperform | Buy |
| C | Next 40% | Marketperform | Hold |
| D | Next 20% | Underperform | Sell |
| F | Bottom 10% of stocks rated | Strongly Underperform | Sell |
FIG. 2B

COMPARISON OF STOCK OPTION PRICING MODELS

S and P 500 Index Options 8/16/05

Assumptions

| | | |
|---|---|---|
| Current Stock Price | $ 1,234.00 | ~100a |
| Option Term | 0.181 | ~100b |
| Risk Free Rate of Return | 2.956% | ~100c |
| Long-Term Return | 9.531% | ~100d |
| Volatility | 0.16 | ~100e |
| PC Adjustment A | 1.01825 | ~100f |
| PC Adjustment B | 1.09938 | ~100g |

CPM Stock Option Pricing Model

| | | Call | Put |
|---|---|---|---|
| Strike Price 1 | $ 1,200.00 | $ 51.29 | $ 10.88 |
| Strike Price 2 | $ 1,215.00 | $ 40.62 | $ 15.04 |
| Strike Price 3 | $ 1,225.00 | $ 33.91 | $ 18.37 |
| Strike Price 4 | $ 1,245.00 | $ 22.09 | $ 26.45 |
| Strike Price 5 | $ 1,250.00 | $ 19.44 | $ 28.77 |
| Strike Price 6 | $ 1,260.00 | $ 14.51 | $ 33.79 |
| Strike Price 7 | $ 1,275.00 | $ 8.02 | $ 42.22 |
| Strike Price 8 | $ 1,280.00 | $ 6.63 | $ 45.80 |
| Strike Price 9 | $ 1,285.00 | $ 6.43 | $ 50.57 |

~102

Black-Scholes Option Pricing Model

| | | Call | Put |
|---|---|---|---|
| Strike Price 1 | $ 1,200.00 | $ 57.02 | $ 18.62 |
| Strike Price 2 | $ 1,215.00 | $ 47.45 | $ 23.96 |
| Strike Price 3 | $ 1,225.00 | $ 41.04 | $ 26.10 |
| Strike Price 4 | $ 1,245.00 | $ 31.43 | $ 35.79 |
| Strike Price 5 | $ 1,250.00 | $ 29.17 | $ 38.50 |
| Strike Price 6 | $ 1,260.00 | $ 25.00 | $ 44.28 |
| Strike Price 7 | $ 1,275.00 | $ 19.57 | $ 53.77 |
| Strike Price 8 | $ 1,280.00 | $ 17.97 | $ 57.14 |
| Strike Price 9 | $ 1,285.00 | $ 16.48 | $ 60.62 |

~104

Actual Market Quotations

| | | Call | Put |
|---|---|---|---|
| Strike Price 1 | $ 1,200.00 | $52.60 | $12.00 |
| Strike Price 2 | $ 1,215.00 | na | $16.20 |
| Strike Price 3 | $ 1,225.00 | $34.20 | $18.40 |
| Strike Price 4 | $ 1,245.00 | $21.00 | $27.50 |
| Strike Price 5 | $ 1,250.00 | $19.00 | $29.00 |
| Strike Price 6 | $ 1,260.00 | $14.70 | na |
| Strike Price 7 | $ 1,275.00 | $9.00 | na |
| Strike Price 8 | $ 1,280.00 | $7.50 | na |
| Strike Price 9 | $ 1,285.00 | $6.30 | na |

COMPARISON OF STOCK OPTION PRICING MODELS
S and P 500 Index Options 02/17/06

Assumptions
| | | |
|---|---|---|
| Current Stock Price | $1,283.38 | ~100a |
| Option Term | 0.175 | ~100b |
| Risk Free Rate of Return | 2.360% | ~100c |
| Long-Term Return | 9.531% | ~100d |
| Volatility | 0.16 | ~100e |
| PC Adjustment A | 1.01891 | ~100f |
| PC Adjustment B | 1.09868 | ~100g |

CPM Stock Option Pricing Model

| | | Call | Put |
|---|---|---|---|
| Strike Price 1 | $ 1,250.00 | $ 54.62 | $ 10.22 |
| Strike Price 2 | $ 1,275.00 | $ 36.73 | $ 17.23 |
| Strike Price 3 | $ 1,285.00 | $ 30.34 | $ 20.80 |
| Strike Price 4 | $ 1,295.00 | $ 24.42 | $ 24.84 |
| Strike Price 5 | $ 1,300.00 | $ 21.64 | $ 27.04 |
| Strike Price 6 | $ 1,310.00 | $ 16.43 | $ 31.79 |
| Strike Price 7 | $ 1,320.00 | $ 11.70 | $ 37.01 |
| Strike Price 8 | $ 1,325.00 | $ 9.51 | $ 39.80 |
| Strike Price 9 | $ 1,335.00 | $ 5.47 | $ 45.73 |

~102

Black-Scholes Option Pricing Model

| | | Call | Put |
|---|---|---|---|
| Strike Price 1 | $ 1,250.00 | $ 60.56 | $ 16.16 |
| Strike Price 2 | $ 1,275.00 | $ 44.79 | $ 25.29 |
| Strike Price 3 | $ 1,285.00 | $ 39.28 | $ 29.74 |
| Strike Price 4 | $ 1,295.00 | $ 34.22 | $ 34.64 |
| Strike Price 5 | $ 1,300.00 | $ 31.86 | $ 37.26 |
| Strike Price 6 | $ 1,310.00 | $ 27.49 | $ 42.85 |
| Strike Price 7 | $ 1,320.00 | $ 23.56 | $ 48.88 |
| Strike Price 8 | $ 1,325.00 | $ 21.75 | $ 52.06 |
| Strike Price 9 | $ 1,335.00 | $ 18.45 | $ 58.71 |

~104

Actual Market Quotations

| | | Call | Put |
|---|---|---|---|
| Strike Price 1 | $ 1,250.00 | $ 54.90 | $ 9.60 |
| Strike Price 2 | $ 1,275.00 | $ 33.80 | $ 15.30 |
| Strike Price 3 | $ 1,285.00 | $ 29.00 | $ 18.00 |
| Strike Price 4 | $ 1,295.00 | $ 21.50 | $ 23.30 |
| Strike Price 5 | $ 1,300.00 | $ 20.00 | $ 24.50 |
| Strike Price 6 | $ 1,310.00 | $ 13.50 | $ 31.70 |
| Strike Price 7 | $ 1,320.00 | $ 9.90 | $ 35.70 |
| Strike Price 8 | $ 1,325.00 | $ 8.00 | $ 43.60 |
| Strike Price 9 | $ 1,335.00 | na | na |

COMPARISON OF STOCK OPTION PRICING MODELS

S and P 500 Index Options 03/09/06

Assumptions

| | | |
|---|---|---|
| Current Stock Price | $1,278.47 | ~100a |
| Option Term | 0.118 | ~100b |
| Risk Free Rate of Return | 2.30% | ~100c |
| Long-Term Return | 9.531% | ~100d |
| Volatility | 16% | ~100e |
| PC Adjustment A | 1.02573 | ~100f |
| PC Adjustment B | 1.09125 | ~100g |

CPM Stock Option Pricing Model      <u>Call</u>    <u>Put</u>  ~102

| | | Call | Put |
|---|---|---|---|
| Strike Price 1 | $ 1,245.00 | $ 45.60 | $ 8.76 |
| Strike Price 2 | $ 1,250.00 | $ 41.86 | $ 10.01 |
| Strike Price 3 | $ 1,270.00 | $ 28.21 | $ 16.30 |
| Strike Price 4 | $ 1,275.00 | $ 25.15 | $ 18.22 |
| Strike Price 5 | $ 1,285.00 | $ 19.46 | $ 22.50 |
| Strike Price 6 | $ 1,295.00 | $ 14.36 | $ 27.38 |
| Strike Price 7 | $ 1,300.00 | $ 12.03 | $ 30.03 |
| Strike Price 8 | $ 1,310.00 | $ 7.80 | $ 35.78 |
| Strike Price 9 | $ 1,325.00 | $ 2.51 | $ 45.45 |

Black-Scholes Option Pricing Model  ~104

| | | Call | Put |
|---|---|---|---|
| Strike Price 1 | $ 1,245.00 | $ 49.87 | $ 13.02 |
| Strike Price 2 | $ 1,250.00 | $ 46.48 | $ 14.62 |
| Strike Price 3 | $ 1,270.00 | $ 34.26 | $ 22.35 |
| Strike Price 4 | $ 1,275.00 | $ 31.55 | $ 24.63 |
| Strike Price 5 | $ 1,285.00 | $ 26.57 | $ 29.61 |
| Strike Price 6 | $ 1,295.00 | $ 22.14 | $ 35.16 |
| Strike Price 7 | $ 1,300.00 | $ 20.13 | $ 38.14 |
| Strike Price 8 | $ 1,310.00 | $ 16.52 | $ 44.49 |
| Strike Price 9 | $ 1,325.00 | $ 12.03 | $ 54.97 |

Actual Market Quotations  ~106

| | | Call | Put |
|---|---|---|---|
| Strike Price 1 | $ 1,245.00 | $ 48.50 | $ 8.60 |
| Strike Price 2 | $ 1,250.00 | $ 41.10 | $ 9.00 |
| Strike Price 3 | $ 1,270.00 | $ 25.00 | $ 14.00 |
| Strike Price 4 | $ 1,275.00 | $ 24.60 | $ 16.60 |
| Strike Price 5 | $ 1,285.00 | $ 19.30 | $ 24.00 |
| Strike Price 6 | $ 1,295.00 | $ 14.10 | $ 26.30 |
| Strike Price 7 | $ 1,300.00 | $ 12.00 | $ 27.50 |
| Strike Price 8 | $ 1,310.00 | $ 8.80 | $ 33.00 |
| Strike Price 9 | $ 1,325.00 | $ 4.70 | $ 45.00 |

FIG. 5C

COMPARISON OF STOCK OPTION PRICING MODELS

S and P 500 Index Options 03/09/06

Assumptions

| | | |
|---|---|---|
| Current Stock Price | $ 1,278.47 | 100a |
| Option Term | 0.195 | 100b |
| Risk Free Rate of Return | 3.100% | 100c |
| Long-Term Return | 9.531% | 100d |
| Volatility | 16% | 100e |
| PC Adjustment A | 1.0167 | 100f |
| PC Adjustment B | 1.1009 | 100g |

CPM Stock Option Pricing Model

| | | Call | Put |
|---|---|---|---|
| Strike Price 1 | $ 1,245.00 | $ 53.22 | $ 12.26 |
| Strike Price 2 | $ 1,250.00 | $ 49.57 | $ 13.57 |
| Strike Price 3 | $ 1,270.00 | $ 35.99 | $ 19.87 |
| Strike Price 4 | $ 1,275.00 | $ 32.86 | $ 21.71 |
| Strike Price 5 | $ 1,285.00 | $ 26.94 | $ 25.73 |
| Strike Price 6 | $ 1,295.00 | $ 21.48 | $ 30.20 |
| Strike Price 7 | $ 1,300.00 | $ 18.91 | $ 32.61 |
| Strike Price 8 | $ 1,310.00 | $ 14.12 | $ 37.76 |
| Strike Price 9 | $ 1,325.00 | $ 8.01 | $ 46.59 |

(102)

Black-Scholes Option Pricing Model

| | | Call | Put |
|---|---|---|---|
| Strike Price 1 | $ 1,245.00 | $ 59.64 | $ 18.66 |
| Strike Price 2 | $ 1,250.00 | $ 56.39 | $ 20.38 |
| Strike Price 3 | $ 1,270.00 | $ 44.44 | $ 28.32 |
| Strike Price 4 | $ 1,275.00 | $ 41.72 | $ 30.57 |
| Strike Price 5 | $ 1,285.00 | $ 36.62 | $ 35.41 |
| Strike Price 6 | $ 1,295.00 | $ 31.98 | $ 40.69 |
| Strike Price 7 | $ 1,300.00 | $ 29.78 | $ 43.48 |
| Strike Price 8 | $ 1,310.00 | $ 25.76 | $ 49.39 |
| Strike Price 9 | $ 1,325.00 | $ 20.48 | $ 59.03 |

(104)

Actual Market Quotations

| | | Call | Put |
|---|---|---|---|
| Strike Price 1 | $ 1,245.00 | na | na |
| Strike Price 2 | $ 1,250.00 | $ 50.50 | $ 15.00 |
| Strike Price 3 | $ 1,270.00 | na | na |
| Strike Price 4 | $ 1,275.00 | $ 33.40 | $ 21.30 |
| Strike Price 5 | $ 1,285.00 | na | na |
| Strike Price 6 | $ 1,295.00 | na | na |
| Strike Price 7 | $ 1,300.00 | $ 19.50 | $ 32.00 |
| Strike Price 8 | $ 1,310.00 | na | na |
| Strike Price 9 | $ 1,325.00 | $ 8.80 | na |

COMPARISON OF STOCK
OPTION PRICING MODELS
Intel 11/4/05

Assumptions
| | | |
|---|---|---|
| Current Stock Price | $ 23.99 | ~100a |
| Option Term | 0.211 | ~100b |
| Risk Free Rate of Return | 3.440% | ~100c |
| Long-Term Return | 9.531% | ~100d |
| Volatility | 40% | ~100e |
| PC Adjustment A | 1.01216 | ~100f |
| PC Adjustment B | 1.09975 | ~100g |

CPM Stock Option Pricing Model

| | | Call | Put |
|---|---|---|---|
| Strike Price 1 | $ 20.00 | $ 4.22 | $ 0.09 |
| Strike Price 2 | $ 22.50 | $ 2.16 | $ 0.51 |
| Strike Price 3 | $ 25.00 | $ 0.81 | $ 1.64 |
| Strike Price 4 | $ 27.50 | $ 0.37 | $ 3.68 |
| Strike Price 5 | $ 1.00 | $ 23.00 | $ - |
| Strike Price 6 | $ 1.00 | $ 23.00 | $ - |
| Strike Price 7 | $ 1.00 | $ 23.00 | $ - |
| Strike Price 8 | $ 1.00 | $ 23.00 | $ - |
| Strike Price 9 | $ 1.00 | $ 23.00 | $ - |

~102

Black-Scholes Option Pricing Model

| | | Call | Put |
|---|---|---|---|
| Strike Price 1 | $ 20.00 | $ 4.45 | $ 0.31 |
| Strike Price 2 | $ 22.50 | $ 2.65 | $ 1.00 |
| Strike Price 3 | $ 25.00 | $ 1.40 | $ 2.23 |
| Strike Price 4 | $ 27.50 | $ 0.67 | $ 3.98 |
| Strike Price 5 | $ 1.00 | $ 23.00 | $ - |
| Strike Price 6 | $ 1.00 | $ 23.00 | $ - |
| Strike Price 7 | $ 1.00 | $ 23.00 | $ - |
| Strike Price 8 | $ 1.00 | $ 23.00 | $ - |
| Strike Price 9 | $ 1.00 | $ 23.00 | $ - |

~104

Actual Market Quotations

| | | Call | Put |
|---|---|---|---|
| Strike Price 1 | $ 20.00 | $ 4.20 | $ 0.10 |
| Strike Price 2 | $ 22.50 | $ 2.05 | $ 0.40 |
| Strike Price 3 | $ 25.00 | $ 0.68 | $ 1.50 |
| Strike Price 4 | $ 27.50 | $ 0.15 | $ 3.70 |
| Strike Price 5 | $ 1.00 | na | na |
| Strike Price 6 | $ 1.00 | na | na |
| Strike Price 7 | $ 1.00 | na | na |
| Strike Price 8 | $ 1.00 | na | na |
| Strike Price 9 | $ 1.00 | na | na |

COMPARISON OF STOCK OPTION PRICING MODELS
Intel 3/9/06

Assumptions
| | | |
|---|---|---|
| Current Stock Price | $ 18.75 | ~100a |
| Option Term | 0.118 | ~100b |
| Risk Free Rate of Return | 2.300% | ~100c |
| Long-Term Return | 9.531% | ~100d |
| Volatility | 40% | ~100e |
| PC Adjustment A | 1.02279 | ~100f |
| PC Adjustment B | 1.08828 | ~100g |

CPM Stock Option Pricing Model

| | | Call | Put |
|---|---|---|---|
| Strike Price 1 | $ 20.00 | $ 0.62 | $ 0.81 |
| Strike Price 2 | $ 22.50 | $ 0.13 | $ 2.81 |
| Strike Price 3 | $ 1.00 | $ 18.75 | $ (0.00) |
| Strike Price 4 | $ 1.00 | $ 18.75 | $ (0.00) |
| Strike Price 5 | $ 1.00 | $ 18.75 | $ (0.00) |
| Strike Price 6 | $ 1.00 | $ 18.75 | $ (0.00) |
| Strike Price 7 | $ 1.00 | $ 18.75 | $ (0.00) |
| Strike Price 8 | $ 1.00 | $ 18.75 | $ (0.00) |
| Strike Price 9 | $ 1.00 | $ 18.75 | $ (0.00) |

~102

Black-Scholes Option Pricing Model

| | | Call | Put |
|---|---|---|---|
| Strike Price 1 | $ 20.00 | $ 0.99 | $ 1.19 |
| Strike Price 2 | $ 22.50 | $ 0.27 | $ 2.96 |
| Strike Price 3 | $ 1.00 | $ 18.75 | $ - |
| Strike Price 4 | $ 1.00 | $ 18.75 | $ - |
| Strike Price 5 | $ 1.00 | $ 18.75 | $ - |
| Strike Price 6 | $ 1.00 | $ 18.75 | $ - |
| Strike Price 7 | $ 1.00 | $ 18.75 | $ - |
| Strike Price 8 | $ 1.00 | $ 18.75 | $ - |
| Strike Price 9 | $ 1.00 | $ 18.75 | $ - |

~104

Actual Market Quotations

| | | Call | Put |
|---|---|---|---|
| Strike Price 1 | $ 20.00 | $ 0.65 | $ 0.80 |
| Strike Price 2 | $ 22.50 | $ 0.15 | $ 2.80 |
| Strike Price 3 | $ 1.00 | na | na |
| Strike Price 4 | $ 1.00 | na | na |
| Strike Price 5 | $ 1.00 | na | na |
| Strike Price 6 | $ 1.00 | na | na |
| Strike Price 7 | $ 1.00 | na | na |
| Strike Price 8 | $ 1.00 | na | na |
| Strike Price 9 | $ 1.00 | na | na |

TABLE 1: Call Option Comparison, S&P 500 Index: 1,234

| Strike Price | Washington Post | Inventive Method | Black-Scholes Method | Difference Between Actual Prices & Method | |
|---|---|---|---|---|---|
| | | | | Inventive Method | Black-Scholes |
| 1,200 | $52.60 | $51.29 | $57.02 | $1.31 | $4.42 |
| 1,225 | 34.20 | 33.91 | 41.64 | 0.29 | 7.44 |
| 1,245 | 21.00 | 21.09 | 31.43 | 1.09 | 10.43 |
| 1,250 | 19.00 | 19.44 | 29.17 | 0.44 | 10.17 |
| 1,260 | 14.70 | 14.51 | 25.00 | 0.19 | 10.30 |
| 1,275 | 9.00 | 8.02 | 19.57 | 0.98 | 10.57 |
| 1,280 | 7.50 | 6.74 | 17.97 | 0.76 | 10.47 |
| 1,285 | 6.30 | 6.54 | 16.48 | 0.24 | 10.18 |

FIG. 6A

Table 2: Put Option Comparison, S&P 500 Index: 1,234

| Strike Price | Washington Post | Inventive Method | Black-Scholes Method | Difference Between Actual Prices & Method | |
|---|---|---|---|---|---|
| | | | | Inventive Method | Black-Scholes |
| 1,200 | $12.00 | $10.88 | $16.62 | $1.12 | $4.62 |
| 1,215 | 18.20 | 15.04 | 21.96 | 3.16 | 3.76 |
| 1,225 | 18.40 | 18.37 | 26.10 | 0.03 | 7.70 |
| 1,245 | 27.50 | 26.45 | 35.79 | 1.05 | 8.29 |
| 1,250 | 29.00 | 28.77 | 38.50 | 0.23 | 9.50 |

FIG. 6B

Table 3: Call Option Comparison, Intel Share Price $23.99

| Strike Price | Wall Street Journal | Inventive Method | Black-Scholes Method | Difference Between Actual Prices & Method | |
|---|---|---|---|---|---|
| | | | | Inventive Method | Black-Scholes |
| $20.00 | $4.20 | $4.22 | $4.45 | $0.02 | $0.25 |
| 22.50 | 2.05 | 2.16 | 2.65 | 0.11 | 0.60 |
| 25.00 | 0.68 | 0.82 | 1.40 | 0.14 | 0.72 |
| 27.50 | 0.15 | 0.37 | 0.67 | 0.22 | 0.52 |

FIG. 6C

Table 4: Put Option Comparison, Intel Share Price $23.99

| Strike Price | Wall Street Journal | Inventive Method | Black-Scholes Method | Difference Between Actual Prices & Method | |
|---|---|---|---|---|---|
| | | | | Inventive Method | Black-Scholes |
| $20.00 | $0.10 | $0.09 | $0.31 | $0.01 | $0.21 |
| 22.50 | 0.40 | 0.51 | 1.00 | 0.11 | 0.60 |
| 25.00 | 1.50 | 1.65 | 2.23 | 0.15 | 0.73 |
| 27.50 | 3.70 | 3.68 | 3.98 | 0.02 | 0.28 |

FIG. 6D

Table 5: Comparison Summary

| Basic Data | | | Key Assumptions | | | Put-Call Parity Adjustment | Average Difference Between Formula & Market Quotes | |
|---|---|---|---|---|---|---|---|---|
| Option | Date | Duration | Volatility | Risk-Free Rate | Long-Term Rate | A/B | CPM | Black-Scholes |
| S&P 500 Index | 08/16/05 | 0.181 | 0.16 | 0.02956 | 0.09531 | 0.058/0.058 | $0.84 | $8.30 |
| S&P 500 Index | 02/17/06 | 0.175 | 0.16 | 0.02300 | 0.09531 | 0.058/0.058 | $1.76 | $11.02 |
| S&P 500 Index | 03/09/06 | 0.118 | 0.16 | 0.02300 | 0.09531 | 0.058/0.058 | $1.42 | $7.52 |
| S&P 500 Index | 03/09/06 | 0.195 | 0.16 | 0.03100 | 0.09531 | 0.058/0.058 | $0.79 | $8.90 |
| | | | | | | | | |
| Intel | 11/04/05 | 0.211 | 0.40 | 0.03440 | 0.09531 | 0.055/0.055 | $0.10 | $0.49 |
| Intel | 03/09/06 | 0.118 | 0.40 | 0.02300 | 0.09531 | 0.055/0.055 | $0.02 | $0.25 |

FIG. 7

Table 6: Employee Options

| | FASB 123(R) DISCLOSURE ILLUSTRATION | | | | |
|---|---|---|---|---|---|
| Firm | Estimated Selling Price | Volatility | Dividend Rate | Call Option Value | |
| | | | | CPM | Black-Scholes |
| Amgen | $73.00 | 47.00% | 0.0% | $18.55 | $33.57 |
| Boeing | $78.00 | 27.80% | 1.9% | $17.44 | $25.11 |
| DuPont | $42.00 | 23.35% | 2.9% | $ 9.11 | $12.15 |
| Freescale | $28.00 | 62.00% | 0.0% | $ 7.69 | $15.66 |
| UPS | $79.00 | 18.21% | 1.6% | $15.37 | $19.94 |

FIG. 8

CONDITIONAL PROBABILITY METHOD FOR STOCK OPTION VALUATION

BACKGROUND OF THE INVENTION

1. Field of the Invention

The present invention relates to a method, a system, and a computer program product for estimating stock option prices using a combination of risk free and long-term equity-based rates of return, historical volatility of the underlying security, and a conditional probability method of data analysis in the estimation model.

2. Background of the Invention

Stock options give the owner a right to buy or sell a specific number of shares of stock during a time and at a specified price. An option to buy is referred to as a "call option," and an option to sell is referred to as a "put option." Stock options always have a start date and an expiration date. If they are not exercised before the expiration date, they are lost. Two styles of options are the European style and the American style. A European style option permits exercise of the option only on the expiration date. In contrast, an American style option permits exercise of the option at any time during its life up to the expiration date. Stock options are publicly traded, and are also commonly granted to employees of the issuing company as part of a compensation package. Generally, stock options which are granted to employees are call options which confers the right to buy stock later in time. The grant or strike price is often the market price of the stock at the time the options are granted.

A simple example regarding employee stock options will illustrate the concept. Assume that a company grants its employee options to buy 1000 shares of stock at $2 a share. The employee can exercise the options starting after a waiting period which is 3 years from the grant date. The expiration date is 4 years from the grant date. On the 3 year date, assume that the stock is at $4 per share. In this case, the employee has three options. The first choice is to convert the options to cash by first purchasing the 1000 shares at $2 per share, and then selling all 1000 shares at $4 per share. The net gain is $2 per share or $2,000. Another choice is to sell some of the shares at $4 per share, and hold the rest to sell later. A third choice is to hold all 1000 shares. If on the 3 year date of the option period, the stock price has fallen below the grant price, the employee would likely let the option expire. For example, if the stock price is at $1, it makes no sense to spend $2 to buy a share that could be bought on the open market for $1.

Accurate option price estimation would help the owner or an options trader to evaluate the risks and benefits of holding the options. Stock option valuation is determined by way of mathematical models. A well known and generally accepted model is the Black-Scholes stock option pricing model published by Fischer Black and Myron Scholes in 1973 in the *Journal of Political Economy*. Segments of the academic community have been studying the Black-Scholes model, and have recognized some shortcomings of its results, in particular that Black-Scholes results have recently tended to overstate options values for options traded on the open market.

The accuracy of any mathematical model can be confirmed by comparing the predicted outcome using reasonable assumptions with actual observed results. For example, using the data for publicly traded options which are published in financial sections, one can apply a forecast formula and compare the results with the actual published prices. Detailed examples of empirical data comparison using both the Black-Scholes formula and the inventive method are provided in the detailed description.

A relatively recent development brought this generally academic issue to the attention of the financial and business communities. A new accounting rule issued in December of 2004 by the Financial Accounting Standards Board (FASB), FAS 123(R) Share-Based Payment, requires that companies issuing employee stock options must expense the options. FAS 123(R) becomes effective in 2006. This means that all companies issuing employee stock options will be assessed a compensation expense and therefore must assign a value to the options at the time they are issued. With the advent of FAS 123(R), the financial and business communities are now more interested than ever in stock option valuation, and have also come to recognize the deficiencies of a model that overstates options values. Even with its deficiencies, Black-Scholes is so well known, that FAS 123(R) mentions "Black-Scholes" by name as one of the very few techniques of determining a stock option value that meets the specified requirements of FAS 123(R).

The problem with option valuation has been reported repeatedly in the financial press. A sampling of articles and opinions pieces published from 2002-2004 in the Wall Street Journal on the subject all carry the same theme: that Black-Scholes tends to overstate values. "The Options-Value Brain Teaser," by Jonathan Weil and Theo Francis, published Aug. 6, 2002, Page C1. "Fixing the Numbers Problems," by Jonathan Weil, published Jan. 13, 2003, Page C1, which states that Black-Scholes makes highly volatile stocks' options appear unduly valuable. "Coke Developed a New Way to Value Options, But Company Will Return to Its Classic Formula," by Jonathan Weil and Betsy McKay, published Mar. 7, 2003, Page C3. "'Kind of Right' Isn't Good Enough," by Craig R. Barrett, at the time the CEO of Intel, became Chairman of the Board in 2005, which discusses the shortcomings of the Black-Scholes formula and the impact on Intel. "The Stock-Option Showdown," by Jonathan Weil and Jeanne Cummins, published Mar. 9, 2004, Page C1, which describes the new accounting rules and the opposition of the tech industry. "Shock! The Numbers Are Merely Estimates," by Jonathan Weil, published Mar. 9, 2004, Page C1, in which the Chief Executive of RSA Security states that the existing models produce inaccurate and misleading information.

Accurately estimating the prices of stock options is obviously useful for an options trader, or a company which issues stock options as part of a compensation program. Anyone holding employee stock options in their investment portfolio would be interested in more accurate valuations to more accurately assess the value of their portfolios. This is important for all financial planning, but particularly for retirement planning. For a company issuing employee stock options, accurate valuation has become even more important with the advent of FAS 123(R), since stock option values must be disclosed in corporate financial statements.

Another reason that more accurate valuations are important is that stock option pricing is a factor that may be used to evaluate the anticipated performance of the underlying stock. In other words, stock option prices contain implicit information regarding the strength of the company as whole. Financial professionals doing their research into companies will be interested in more accurate estimates of stock option pricing.

At the time of its publication in 1973, the Black-Scholes option pricing formula provided a breakthrough theoretical framework for pricing options and other derivative instruments, and launched the field of financial engineering. The Black-Scholes formula prices European call or put options on a stock that is assumed to pay no dividends or make other distributions. The formula assumes that the underlying stock price follows a geometric Brownian motion, and is developed using a partial differential equation for valuing claims contingent on the underlying stock price. In the original Black-Scholes formula, values for a call price c or put price p are:

$$c = SN(d_1) - Ke^{-rt}N(d_2)$$

$$p = Ke^{-rt}N(-d_2) - SN(-d_1)$$

where:

$$d_1 = \frac{\ln(S/K) + (r + \sigma^2/2)t}{\sigma\sqrt{t}}$$

$$d_2 = d_1 - \sigma\sqrt{t}$$

And the variables denote the following:
S=the price of the underlying stock;
K=the strike price;
r=the current continuously compounded risk free interest rate;
t=the time in years until the expiration of the option;
σ=the estimated volatility for the underlying stock; and
N=the standard normal cumulative distribution function.

Since the original Black-Scholes formula was published, the academic financial community has recognized that the formula has become inaccurate, even in markets where one could expect it to be most accurate. Numerous experts have worked to try to pinpoint the issues in Black-Scholes which may be responsible for the problematic results. For the most part, the experts have focused on σ, the volatility parameter. Volatility is quantified as a measure of the degree to which the price of the underlying stock tends to fluctuate over time, and is expressed in decimal form, for example, an annualized volatility of 10% is expressed as 0.10. Volatility estimates for the future have generally been based on historic volatility. One approach to correcting the Black-Scholes accuracy problems resulted in an extension of the Black-Scholes model using a parameter labeled "stochastic volatility" which is a modified way of quantifying and calculating volatility. Despite its recognized shortcomings, for lack of a better model, Black-Scholes or some modification of it, continues to be used widely.

One of the underlying deficiencies of conventional stock option pricing models is the use of historical investment return data as if the data points were independent events for the purpose of statistical analysis. However, the historical performance of the stock market may more correctly be viewed as a single event, and data more correctly viewed as periodic observations in that single event. More detailed analysis of this particular shortcoming is addressed in an article authored by the inventor, "Correcting the Overstatement in Investment Forecasts," published in the *Journal of Financial and Economic Practice*, Vol. 3, No. 1, Fall 2004, the entire contents of which is hereby incorporated by reference. Further illumination on the use of conditional probabilities for investment forecast modeling is described in another article authored by the inventor, "The Tendency of the Arithmetic Mean to Overstate Expected Returns," published in the *Journal of Financial and Economic Practice*, Vol. 6, No. 1, Fall 2005, the entire contents of which is also hereby incorporated by reference.

It is generally accepted that adjustments to the conventional models which address the volatility parameter do not seem to produce consistently better results.

Another problematic feature of the Black-Scholes model was setting the discount rate at the risk-free rate of return. The original presentation included in the Black-Scholes 1973 paper had an unstated assumption that there is one and only one investment return parameter. The presentation thus precluded the possibility of a stock option pricing model that reflects the dynamic interaction of both risk-free and long term equity based rates of return.

There has been a need for a method for stock option valuation that more accurately matches listed option prices when compared with empirical data.

SUMMARY

Adjustments to the conventional valuation model have stayed within the same theoretical framework as Black-Scholes, and focused on specific parameters that were thought to need correction, such as the volatility parameter. The model embodied in the present invention is a result of reevaluating the theoretical framework itself. In simplified terms, the present invention presents a new theoretical framework which views historical market performance as a single long term event with periodic observations. These periodic observations are the data points which heretofore have been viewed as independent events for statistical analysis purposes. This new model posits that the correct way to view historical market performance is to assume that performance in one year is conditioned upon the observed investment performance for the entire investment period which serves as the source of the data. The new model employs both short-term factors and long-term rates of return of the underlying security to provide a more accurate forecast of the option. Thus, it is a conditional probability method with more parameters than conventional models.

Accordingly, it is an object of the invention to provide a novel method, system and computer program product for valuation of stock options that provides more accurate results than conventional methods.

It is another object of the present invention to provide a novel method, system and computer program product for valuation of stock options using an expected long-term rate of return parameter.

It is another object of the present invention to provide a novel method, system and computer program product for valuation of stock options using a conditional probability volatility parameter.

It is a further object of the present invention to provide a novel method, system and computer program product for valuation of stock options using put-call parity adjustment parameters.

It is another object of the present invention to provide a novel method, system and computer program product to obtain reasonable assumptions of investment return and risk of an individual security by applying the inventive method retrospectively rather than prospectively.

These and other objects are provided by a method, system, and computer program product for determining stock option pricing in which the interplay of risk-free interest rates and long-term equity based rates of return results in a more accurate estimate of options prices as compared to conventional models. The method of the present invention employs additional parameters to address the accuracy problems of the Black-Scholes model.

To implement the method of the present invention, some preprocessing steps must occur. These include the need to collect and analyze price data for the underlying stock and calculate the volatility parameter σ, and the continuously compounded expected long-term rate of return g. The premium for investing in options rather than the underlying security z must also be determined. These parameters are determined by examining historical price data of the underlying security. These parameters are then input along with the known variables; the current stock price S, the strike price K, the continuously compounded risk-free rate of return r, the time period until expiration t and the cumulative normal distribution N.

The computer implemented method of the present invention then calculates a conditional probability volatility parameter v and put-call parameters A and B which are used to calculate the estimated option price.

The present invention can also be employed in a retrospective analysis in which the reasonable performance assumptions of a stock can be obtained based on historical volatility and present day prices.

Other configurations, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The figures include flowcharts and schematics which are intended to illustrate the principles of the invention.

FIG. 2A is a flowchart showing the subroutine for step S3 of FIG. 1, for determining the current continuously compounded expected long term rate of return, g.

FIG. 2B is a table containing the Schwab equity ratings.

FIG. 2C is a flowchart showing the subroutine for class of stock adjustment to g.

FIGS. 5A-5F are images of spreadsheet screens that illustrate implementation of the present invention with a standard spreadsheet program.

FIGS. 6A-6D are tables containing empirical data comparisons between the prior art method and the inventive method as described the Examples.

FIG. 7 is a table containing a comparison summary of values calculated using the Black-Scholes model and the CPM model.

FIG. 8 is a table containing employee stock option values calculated using the CPM model.

DESCRIPTION OF THE APPENDICES

The following appendices form a part of this disclosure, and are hereby incorporated by reference in their entireties.

Appendix A is a copy the inventor's article "Correcting the Overstatement in Investment Forecasts," published in the *Journal of Financial and Economic Practice*, Vol. 3, No. 1, Fall 2004.

Appendix B is a copy of the inventor's article "The Tendency of the Arithmetic Mean to Overstate Expected Returns," published in the *Journal of Financial and Economic Practice*, Vol. 6, No. 1, Fall 2005.

Appendix C is a copy of the inventor's article "Analyzing Investment Data Using Conditional Probabilities The Implications for Investment Forecasts, Stock Option Pricing, Risk Premia, and CAPM Beta Calculations," to be published in the *Journal of Financial and Economic Practice* in the spring of 2006.

Appendix D is a copy of the inventor's article "The CPM Stock Option Pricing Model," which is to be submitted for publication in the fall of 2006.

DETAILED DESCRIPTION

The valuation method of the present invention employs a novel set of parameters and processes to arrive at a more accurate estimate of stock option prices than has been previously available. An article titled "Analyzing Investment Data Using Conditional Probabilities: The Implications for Investment Forecasts, Stock Option Pricing, Risk Premia, and CAPM Beta Calculations," by the inventor, to be published in the *Journal of Financial and Economic Practice* in the spring of 2006, contains a detailed explanation of the theory, mathematics and derivation of the inventive method, and is hereby incorporated by reference in its entirety. For convenience, this article is referred to herein as the "Conditional Probabilities" article. An article titled "The CPM Stock Option Pricing Model," by the inventor, to be submitted for publication in the fall of 2006, sets forth the mathematical derivation of the conditional probability formula for stock option valuation, and further details of this new model, and is hereby incorporated by reference in its entirety. For convenience of reference, the inventive model is referred to herein as the CPM model.

Figure 1:
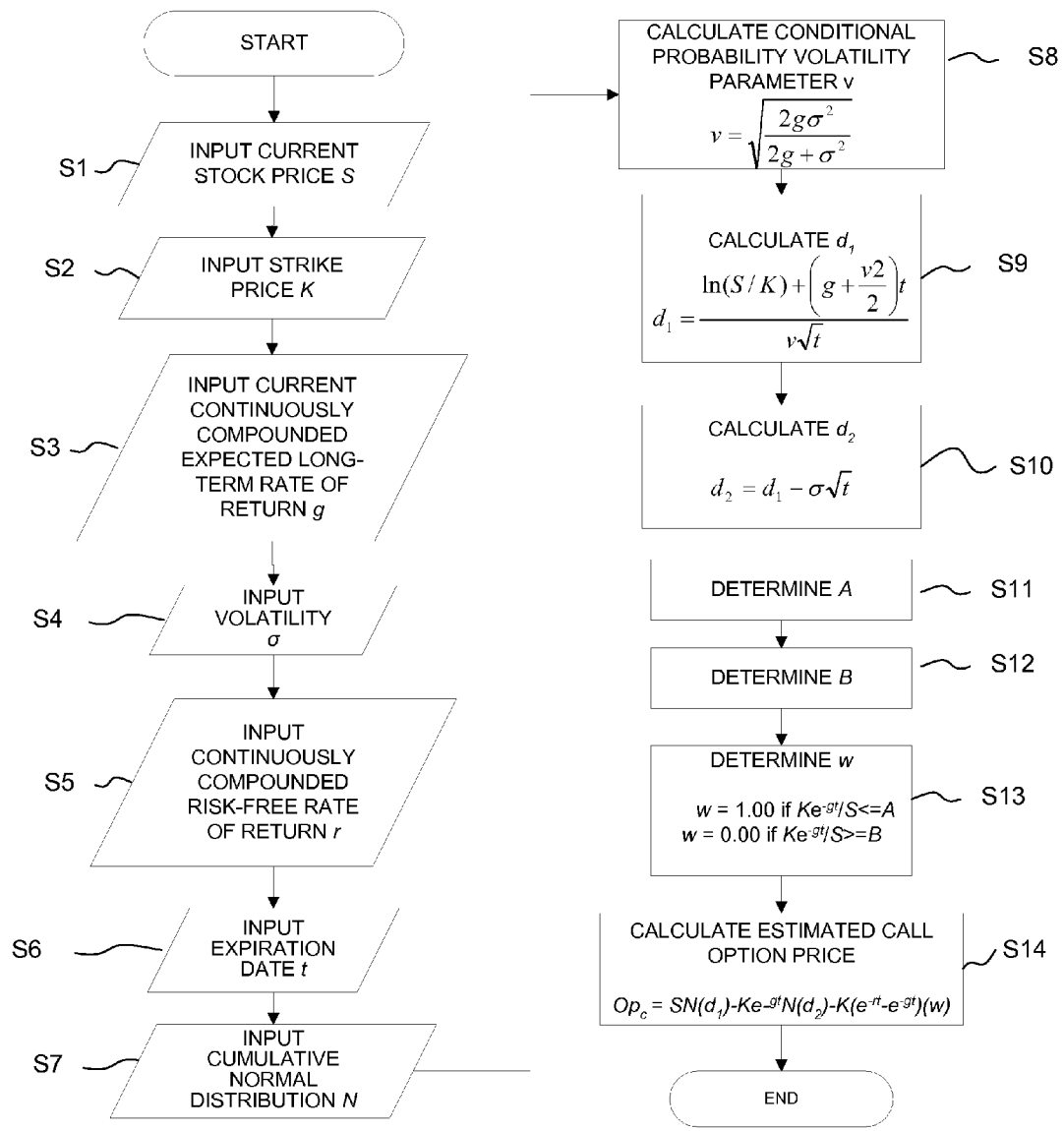
FIG. 1 is a flowchart showing a stock option forecast for a call option using the expected long-term rate of return, and the conditional probability volatility parameter.

Referring to the drawings, FIG. 1 is a flowchart that shows the calculation of an estimated call option price with seven parameters input in steps S1-S7. The calculations are shown in steps S8-S14. It will be instructive to expand upon the information regarding call and put options from the Background section. As described above, a call option is a contract giving the holder the right to purchase a share of stock at the preestablished price, i.e., the strike price. A put option is a contract giving the holder a right to sell a share of stock at a strike price. Call options are the types of options that are commonly used in employee compensation packages. Both types of options are also publicly traded on an options exchange.

The purpose of an option valuation model is to determine an estimated value on the option itself, that is, the right to purchase or sell shares at a fixed price. This is what is referred to herein as a prospective valuation because it uses reasonable assumptions to estimate the present day value of the option. In contrast, what is referred to herein as a retrospective application employs the model to produce reasonable performance assumptions of a stock based historical volatility and present day prices. Both of these uses can be obtained applying the principles of the forecast model embodied in the present invention.

With regard to a prospective valuation, a stock option has a present day value even if shares are currently trading for less than the strike price, for a call option, or trading for more than the strike price, for a put option, because of the potential that the share price will change over time. The value of the option depends on the distribution of anticipated changes in the value of the underlying stock. For example, for a call option if there is a relatively high probability that the stock price will grow to exceed the strike price, the option clearly has more value than if there is a high probability that the stock price will always remain below the strike price.

As described in the Background section, the prevalent model used for option forecasting is the Black-Scholes model. It has been observed that in the development of the Black-Scholes formula, two parameters, the discount parameter and the volatility parameter, are related. The calculation of one parameter is dependent upon the calculation of the other. The Black-Scholes model uses the risk free rate for the discount rate r and volatility σ as measured by the standard deviation of the logarithms of historical returns for the underlying security expressed as an annual percentage. Traditionally, these parameters have been independently calculated. If each of these parameters is calculated independently, the relationship between them could be lost, and the option valuation results would be skewed. In fact, this relationship between volatility and the discount rate must be maintained in order to achieve accurate forecasts. A full explanation and derivation of this observation can be found in the "Conditional Probabilities" article cited above.

In contrast, the method of the present invention employs a new parameter called the conditional probability volatility parameter v. This new volatility parameter v establishes a relationship between the volatility parameter and the discount rate, which is the continuously compounded expected long-term rate of return for the underlying stock g. This always assures that the relationship between the expected return and the expected volatility is maintained.

Another aspect of the present invention is that it addresses the importance of the risk-free interest rate and the put-call parity theorem. The put-call theorem states that for a given strike price, the difference between an actual call price and an actual put price must equal the difference between the current share price of the underlying stock, and the strike price discounted at the risk-free rate of return. This theorem addresses the relationship between a given put price and a given call price, not their specific values. The model embodied in the present invention includes parameters to reflect the put-call parity theorem. By examining empirical data, it has been observed that at strike levels somewhat below the current stock price, the put option formula of a theoretically developed model tends to match actual put option prices. If the theoretical call prices are then adjusted to comply with the put-call parity theorem, they also match the actual call prices. However, at strike levels somewhat above the current stock price, the reverse is true. At the higher strike levels, the theoretically developed call option formula tends to match actual call option prices. Again, if the theoretical put option prices are adjusted to comply with the put-call parity theorem, they too match actual put option prices. These results are exactly what would be expected. For relatively low strike levels, the theoretical put option price approaches zero so that it cannot be adjusted. Instead adjustments must be made to the call option formula. For relatively high strike levels, the reverse is true, since at high strike levels, the call option prices approach zero. The model embodied in the present invention includes built-in adjustments to the theoretical option prices to reflect the put-call parity theorem.

The present invention also quantifies the generally higher risk and higher reward expectation of a typical investor who is investing the options market. Since the options market is quite volatile, a typical investor likely expects a premium for investing in options rather than the underlying security. This consideration is addressed by the present invention by parameter z which is expressed as a premium percentage. The determined theoretical prices are multiplied by $e^{-zt}$ to reflect the investor's desire and expectation.

The conditional probability model of the present invention is parameter driven. The parameters used in the formula comprise:

S=the current stock price.

K=strike price.

t=time remaining until expiration expressed in years.

r=current continuously compounded risk-free interest rate.

z=the premium for investing in options instead of investing in the underlying security.

δ=the expected dividend return rate.

g=current continuously compounded expected long-term rate of return for the underlying security, less the dividend return rate. For companies that do not pay dividends, this would normally range from around 10% (g=0.09531) for stocks of larger companies to around 11.5% (g=0.10885) for stocks of smaller companies.

σ=volatility as measured by the standard deviation of the logarithms of historical returns, expressed as an annual percentage. This is the same volatility measure that is currently used in Black-Scholes calculations.

A=the strike level at which the put-call parity adjustment begins to be transferred from the call option formula to the put option formula. A is expressed as a percentage of the strike level at which the unadjusted theoretical call option price equals the unadjusted theoretical put option price.

B=the strike level at which the put-call parity adjustment is fully transferred from the call option formula to the put option formula. B is expressed as a percentage of the strike level at which the unadjusted theoretical call option price equals the unadjusted theoretical put option price.

The specific formula for the estimated put option price, assuming z=0, is:

$$OP_p = SN(d_1) - Ke^{-gt}N(d_2) - (S - Ke^{-gt}) + K(e^{-rt} - e^{-gt})$$
$$(1-w)$$

and the specific formula for the estimated call option price, assuming z=0, is:

$$OP_c = SN(d_1) - Ke^{-gt}N(d_2) - K(e^{-rt} - e^{-gt})(w)$$

N refers to the cumulative normal distribution, and e is the base of the natural logarithm (e=2.7183).

where:

$$d_1 = \frac{\ln(S/K) + \left(g + \frac{v^2}{2}\right)t}{v\sqrt{t}}$$

$$d_2 = d_1 - v\sqrt{t}$$

$$v = \sqrt{\frac{2g\sigma^2}{2g + \sigma^2}}$$

w=weight parameter. This parameter expresses the percentage weight given to the call option formula in order to reflect the put-call parity adjustment factor. The parameter w=1.00 if $K \leq ASe^{gt}$, w=0.00 if $K \geq BSe^{gt}$. For values of K between $ASe^{gt}$ and $BSe^{gt}$, $OP_c$ is calculated by linear interpolation. Specifically, $$OP_c(K) = \frac{(K - ASe^{gt})(OP_c(BSe^{gt})) + (BSe^{gt} - K)(OP_c(ASe^{gt}))}{BSe^{gt} - ASe^{gt}}$$

For values of K between $ASe^{gt}$ and $BSe^{gt}$, $OP_p(K)$ is calculated using the normal put-call parity adjustment process. Specifically, $$OP_p(K) = OP_c(K) - S + Ke^{-rt}.$$

These results may be adjusted to reflect a non-zero option premium by subtracting the following amount from both the put option and the call option price.

$$(1-e^{-zt})[\min\{OP_c(K), OP_p(K)\}]$$

where $OP_p(K)$ and $OP_c(K)$ are as defined by equations at paragraphs 68-80 above.

The resulting estimated call or put option price is a useful, concrete and tangible result to be used by corporations for complying with the stock option valuation reporting requirements of FAS 123(R); or by investors for analyzing the value of their investment portfolios. Applying the formula in a retrospective manner by inputting the current option price and solving for g, the expected long-term rate of return, is also a useful, concrete and tangible result as this information can be used by investors and professionals to quantify the risks and benefits of holding a particular security.

As described previously, the forecast model embodied in the present invention has philosophical and theoretical differences from Black-Scholes model. From a formulaic and programming point of view the main differences between the conventional Black-Scholes model and the conditional probability model are (i) the use of an expected long-term rate of return parameter g; (ii) the use of a conditional volatility parameter v instead of the volatility parameter σ alone; (iii) the built-in adjustment process to meet the requirements of the put-call parity theorem; and (iv) the use of an option premium to reflect the higher risk associated with investing in options instead of investing in the underlying security.

First, as the expected long-term rate of return g, step S3 of FIG. 1, derivation of this parameter requires the collection of historical data of the underlying stock and a careful analysis of this data to determine an expected long-term rate of return. The subroutine for step S3 is shown in FIG. 2A. As a general rule, the expected long-term rate of return is determined by the class to which the security belongs. For larger company stock the expected long-term return would be 10%. For smaller company stock the expected long-term return would be 11.5%. Either of these numbers is then further adjusted based on market analyst expectations. The Schwab Equity Ratings A, B, C, D, and F, are examples of the type of analyst expectations that could be used to make these further adjustments. These ratings are shown in a table in FIG. 2B. The adjustment might be an additional 1% for securities that analysts rate as a strong buy, and a subtraction of 1% for securities that analysts rate as a sell. This adjustment is detailed in FIG. 2C.

Second, as the new conditional volatility parameter v, this parameter as shown in the formula above, relates the calculated long-term rate of return g with the volatility parameter σ. This provides a truer picture of the volatility of the underlying stock. Volatility σ is calculated from a sampling of historical investment return data. Letting M be the mean of the sample data, and S be the standard deviation, σ is calculated as follows:

$$\sigma = \sqrt{\ln\left[1 + \left(\frac{M}{1+S}\right)^2\right]}$$

Input of volatility parameter σ is step S4 of FIG. 1. Steps S5, S6 and S7 are simple inputs of known data.

Volatility parameter σ is the same as used in the Black-Scholes formula. The conditional nature of historical data is reflected by the construction of a new volatility parameter v which is calculated in step S8 in FIG. 1, and is defined as follows:

$$v = \sqrt{\frac{2g\sigma^2}{2g + \sigma^2}}$$

Intermediate calculations for $d_1$ and $d_2$ are shown in steps S9 and S10, respectively.

Third, as to the adjustments for the put-call parity theorem, parameters A and B are determined in steps S11 and S12, FIG. 1. The weight parameter w is then calculated, step S13, using factors A and B to adjust the theoretical price to reflect the requirements of the theorem. As a general rule $A=e^{-g\sqrt{t}}$ and $B=e^{g\sqrt{t}}$. These are the default formulae for these parameters. Each of these parameters could be adjusted slightly to reflect current market conditions. The above parameters would be increased slightly to reflect a current market preference for put options, or decreased slightly to reflect a current market preference for call options. The degree of adjustment can be determined by testing the above parameters on an established, publicly traded market such as the market for S&P 500 Index Options. The default formulae for A and B can be calculated, and the results compared with the actual listed market quotations for a well-established options market and anticipated option prices using the CPM model. A and B rising indicates a bullish market, while A and B falling indicates a bearish market. Once the necessary adjustment in parameters A and B is determined, the CPM model matches actual market quotations well. These adjustments to parameters A and B may then be used to estimate option prices for options that are either not publicly traded, or in options markets that are not well established.

Step S14 of FIG. 1 shows the calculation for the estimated call option price. For an estimated put option price, the formula in S14 would be substituted for the formula shown in paragraph 68 herein.

Figure 3:
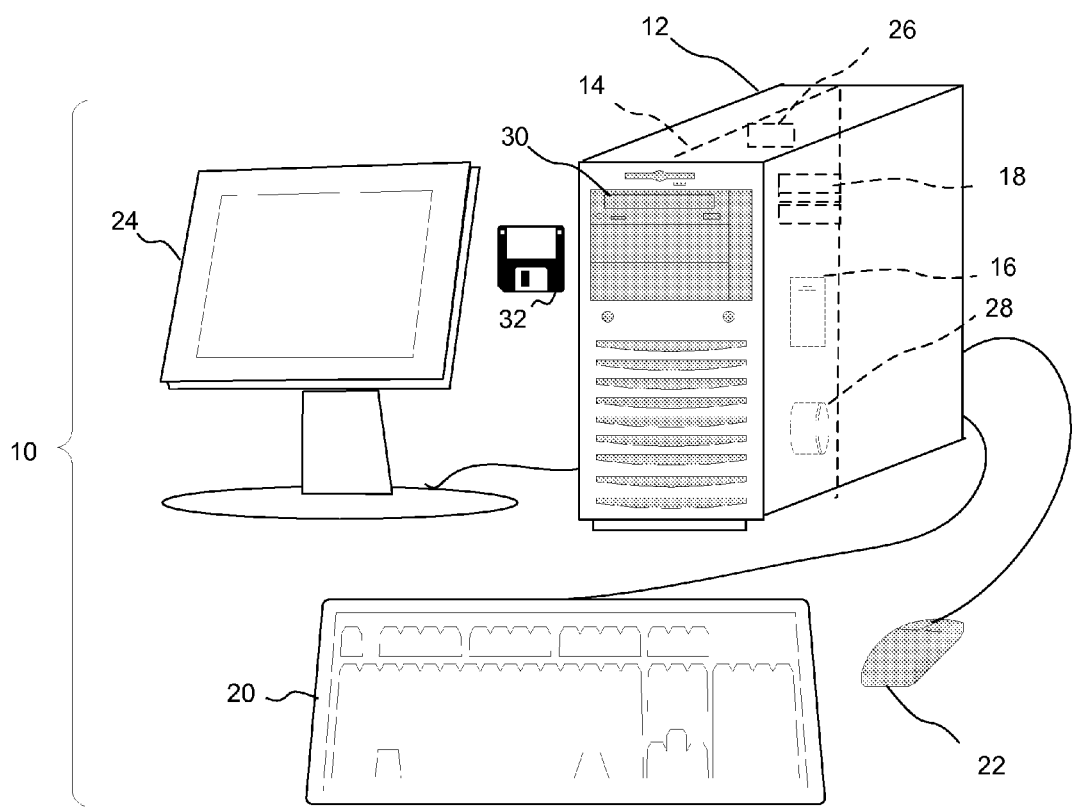
FIG. 3 is a schematic diagram of a general purpose computer programmed according to the teachings of the present invention.

Reviewing the conditional probability model again from a market perspective, all of the parameters relate to one another to reflect the reality of the market. Because of the self-correcting nature of the market, estimated volatility σ overstates the impact of volatility over time. This is true because if the rise of the market is deemed to be too fast, the market tends to correct itself by pushing prices down. The result is that estimated volatility derived from actual market data, without adjusting for the self correcting nature of the market, tends to overstate the portion of expected return which is attributable to volatility of the underlying security. This problem is completely corrected with the new volatility parameter v Preferably, the method of the present invention is programmed for execution on a computer system to cause the computer to perform the method steps to estimate stock option prices. The computer system and program provide the means for performing the claimed method steps. Such a program may be contained on a computer readable medium so that the program can be executed on any suitable standalone computer after, for example, loading the program from a CD or downloading the program from a remote source via a computer network. FIG. 3 illustrates schematically a general purpose computer system 10 for implementing the present invention and comprises a computer housing 12 containing a motherboard 14 on which is mounted a CPU 16, and memory 18. Memory 18 is intended to include all types of computer memory including but not limited to random access memory (RAM), dynamic RAM (DRAM), static RAM (SRAM), synchronous DRAM (SDRAM), flash RAM, read-only memory (ROM), programmable ROM (PROM), erasable PROM (EPROM), electrically erasable EPROM (EEPROM), or any other desired memory. The motherboard may also include other optional logic devices such as application specific integrated circuits (ASICs) or configurable logic devices such as generic array of logic (GAL) or reprogrammable field programmable gate array (FPGA). Computer 10 also includes a keyboard 20 and mouse 22, and a monitor 24 controlled by a display card 26. Computer 10 also includes a hard disk 28 or other fixed, high density media drive, and a removable media device drive 30 into which a removable magneto-optical media such as a disk 32 is inserted and read and/or written to. These discrete components are connected using an appropriate device bus. Computer 10 may also be connected to a printer (not shown) to provide printed listings of any of the inputs, intermediate calculations, and outputs associated with the estimated option price.

Examples of computer readable media present in the system illustrated in FIG. 3 include the memory, the hard disk, and the removable media. Stored on any one or a combination of computer readable media, the present invention includes software for controlling the hardware of the computer and for enabling the computer to interact with a user. The software may include, but is not limited to, device drivers, operating systems and user applications. Computer readable media further includes the computer program product of the present invention for calculating an estimated option price. The present invention may be implemented on a machine, such as a general purpose computer 10 that transforms data representing the current stock price S, the strike price K, etc. to achieve a practical application, for example, the estimated present day value of a stock option.

Information relating to each stock option calculation is stored in a database organized using data structures, e.g., records, arrays, and/or fields, contained in memory. The stored information may include information for implementing the present invention.

Figure 4:
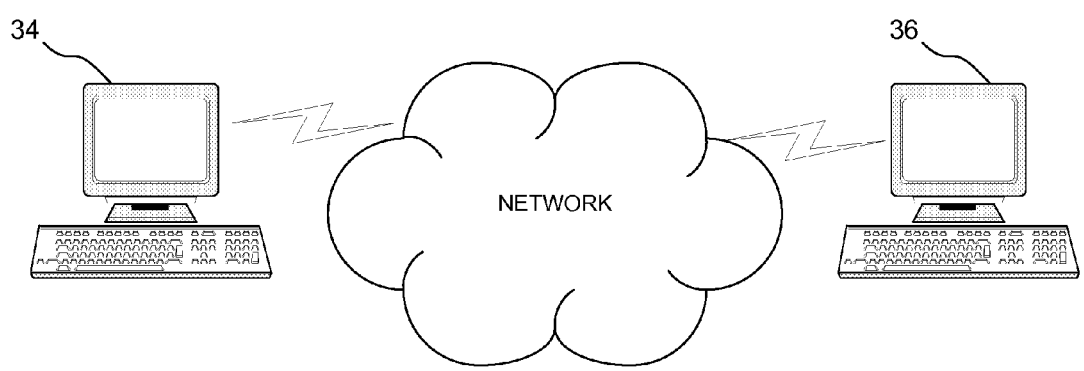
FIG. 4 is a schematic diagram of a simplified computer network on which the method of the present invention could be implemented.

It is also contemplated that such a computer program could reside on a host computer or server 34, and be executed on the host or server after receiving input from a remote computer 36 via a computer network as shown schematically in FIG. 4. This is the scenario in which a user at a remote computer 36 connected to a computer network manually inputs some of the data of method steps S1 through S7, and the calculations of method steps S8 through S14 are performed on host or server 34. The program could easily be adapted to prompt the user to input the necessary data to run the calculations. In this scenario, it is also possible that some of the data of method steps S1 through S7, such as published data or publicly available data like the current stock price, the risk-free rate of return r or the cumulative normal distribution N, and the host or server can be programmed to obtain the data from published sources, databases, uploaded spreadsheets, or the like, to minimize the parameters that must be manually input on the remote computer.

The computer network could be a private computer network and/or a publicly accessible computer network. Examples of the types of computer networks over which the present invention could be implemented include local area networks (LANs) and wide area networks (WANs), including the Internet. Computer network systems within companies could easily be provided with the necessary programs to execute the method of the present invention on their internal computer networks. The term "remote computer" can refer to a workstation connected to a server in a LAN. It can also refer to a standalone computer like computer 10 that accesses a host computer or server via the Internet.

FIGS. 5A-5F are schematics of spreadsheet screen shots that illustrate how stored information may be organized into a data structure for implementing the present invention. The data structure embodied in FIGS. 5A-5F includes linked data fields for determining, among other things, the conditional probability volatility parameter. The screen shots of FIGS. 5A-5F are discussed in the Examples provided hereinbelow. Alternatively, other equivalent ways of implementing the data structure embodied by FIGS. 5A-5F can be implemented to achieve the desired function and results.

Another valuable way to apply the present invention would be in what is referred to herein as a retrospective application in which present day prices are input to obtain reasonable performance assumptions of a stock based on historical volatility. Formulaically, this is solving the equation for the option price for the variable g the continuously compounded expected long-term rate of return. The result is really an assumption about the stock's long term performance, and can be used by an investment advisor, for example, to analyze that individual security's potential performance as compared to other investment opportunities. This type of information could be used by a financial advisor to advise an investor regarding the potential benefits and risks of holding an individual security as compared to a mutual fund or other type of investment. To understand how this may work in practice, consider that the stock market as modeled by the S&P 500 has a long history. The average return has been around 10% and average volatility around 16%. Using these assumptions in the forecast model of the present invention the results match the S&P option quotations quite well. This confirms that investors in S&P 500 options are expecting the market to behave pretty much as it has historically. With an individual security the historic volatility might have been higher than market volatility. For example, 40% vs. 16%. Yet it is possible that this security's return has settled down to the point where it only matches actual market returns. Using an expected return of 10%, the same as the market, and a volatility of 40%, the forecast model of the present invention would match these traded options quotations quite well. This may have significant consequences for investors. If an investor is seeking a 10% return, the investor may do better to buy an S&P 500 index fund rather than the individual security because they are likely to get the same expected return with less risk, that is, a less volatile instrument.

Another example is a company which has a historic volatility of around 70%. When this information along with current option price is input into the present method, the long-term expected rate of return must be 12.5% to match the current option prices. The forecast of the options market in this embodiment of the invention indicates that investors are expecting a 12.5% return from this company. The process is done iteratively. Successively larger expected returns are entered into the model, until the produced list of option prices matches the actual quotations.

To test the theoretical model embodied in the present invention, it is possible to compare the predicted outcome using reasonable assumptions with actual observed results. The examples provided below compare actual market prices with option prices predicted by the forecast model of the present invention and the conventional Black-Scholes model.

Example 1

This example is based on the S&P 500 Index Options. The data for this example was taken from the Business Section of The Washington Post for Aug. 16, 2005 which listed prices for 13 different 66-day S&P 500 Index options. The relevant assumptions used for the comparison are:
 Estimated Volatility ($\sigma$): 16%
 Estimated Long-Term Rate of Return (g): 9.531%
 Estimated Current Risk-Free Rate of Return (r): 2.945%
 Adjustment Parameter A: 1.02
 Adjustment Parameter B: 1.10
The screen shot for this set of parameters is shown in FIG. 5A. The assumption parameters in blocks 100a-100g, and the strike prices are inputs into the computer model that calculates the option prices. This particular program was designed to output option prices using both the CPM model, block 102, and the Black-Scholes model, block 104, for comparison purposes. The actual market quotations in block 106 are input from a source such as The Washington Post. After one set of strike prices are entered, this particular program auto-populates the strike price fields for the other model and the market quotations sections. A comparison of the call option estimates with the Black-Scholes estimates and the actual market prices is shown in Table 1, FIG. 6A. A comparison of the put option estimates with Black-Scholes estimates and the actual market prices is shown in Table 2, FIG. 6B. As seen in these tables, the inventive method predicted outcomes that are much closer to the actual market price as compared to the Black-Scholes method. The average difference between the actual market price and the calculated call or put price of the inventive method is $0.84. In contrast the average difference between the actual market price and the calculated call or put price using Black-Scholes method is $8.30.

Example 2

This example is also based on the S&P 500 Index Options of 64-day duration. The data for this example was taken from the Business Section of The Washington Post for Feb. 17, 2006, showing prices for sixteen different 64-day S&P 500 Index options. The relevant assumptions used for the comparison are:
 Estimated Volatility ($\sigma$): 16%
 Estimated Long-Term Rate of Return (g): 9.531%
 Estimated Current Risk-Free Rate of Return (r): 2.327%
 Adjustment Parameter A: 1.02
 Adjustment Parameter B: 1.10
The screen shot for this set of parameters is shown in FIG. 5B.

Example 3

Another S&P 500 Index Options example is based data from the Business Section of The Washington Post for Mar. 9, 2006, for 43-day options. The relevant assumptions are:
 Estimated Volatility ($\sigma$): 16%
 Estimated Long-Term Rate of Return (g): 9.531%
 Estimated Current Risk-Free Rate of Return (r): 2.327%
 Adjustment Parameter A: 1.03
 Adjustment Parameter B: 1.09
The screen shot for this set of parameters is shown in FIG. 5C.

Example 4

Another S&P 500 Index Options example is based data from the Business Section of The Washington Post for Mar. 9, 2006, for 71-day options. The relevant assumptions are:
 Estimated Volatility ($\sigma$): 16%
 Estimated Long-Term Rate of Return (g): 9.531%
 Estimated Current Risk-Free Rate of Return (r): 3.149%
 Adjustment Parameter A: 1.02
 Adjustment Parameter B: 1.10
The screen shot for this set of parameters is shown in FIG. 5D.

Example 5

This example is based on The Wall Street Journal Listed Option Quotations for Nov. 4, 2005 which lists eight different 77-day options for Intel Corporation. The relevant assumptions based on historical data and reasonable expectations are as follows:
 Estimated Volatility ($\sigma$): 40%
 Estimated Long-Term Rate of Return (g): 9.531%
 (This assumption is net of Intel's expected 1.4% dividend rate.)
 Estimated Current Risk-Free Rate of Return (r): 3.440%
 Adjustment Parameter A: 1.01
 Adjustment Parameter B: 1.10
The screen shot for this set of parameters is shown in FIG. 5E. The comparative results for the call option are shown in Table 3, FIG. 6C, and the results for the put option are shown in Table 4, FIG. 6D. As seen in these tables, again the inventive method predicted outcomes that are much closer to the actual market price as compared to the Black-Scholes method. The average difference between the actual market price and the calculated call or put price of the inventive method is $0.10. In contrast the average difference between the actual market price and the calculated call or put price using Black-Scholes method is $0.49.

Example 6

This example is based on The Wall Street Journal Listed Option Quotations for Mar. 9, 2006, which lists four different 43-day options for Intel Corporation. The relevant assumptions based on historical data and reasonable expectations are as follows:
 Estimated Volatility ($\sigma$): 40%
 Estimated Long-Term Rate of Return (g): 9.531%
 (This assumption is net of Intel's expected 1.4% dividend rate.)
 Estimated Current Risk-Free Rate of Return (r): 2.327%
 Adjustment Parameter A: 1.03
 Adjustment Parameter B: 1.09
The screen shot for this set of parameters is shown in FIG. 5F. A comparison table showing a summary of the calculations from empirical data in the preceding examples is provided in FIG. 7. The put-call parity adjustment reflects the addition to or subtraction from the theoretical put-call parity parameters described in paragraph 93. This comparison shows that the average difference between a Black-Scholes estimate and an actual market quotation is approximately eight times the average difference between a CPM estimate and an actual market quotation.

The Black-Scholes values can deviate significantly from actual quotations in well-established option markets such as the S&P 500 Index Options. The impact of Black-Scholes is irrelevant due to the historical data available and acceptance of Black-Scholes' shortcomings. However, in newer markets without much history, Black-Scholes is so well-known and entrenched, that the Black-Scholes values drive the market in spite of its widely accepted shortcomings. In securities with a short public trading history, it is possible that Black-Scholes values will be closer to the actual market quotations, for the reason that analysts have few other tools to use.

One of the important applications of the CPM model may be in the valuation of employee stock options for expensing and disclosure purposes as required by FASB 123(R). The impact of the use of the CPM model is illustrated in the following example evaluating employee stock options which are not publicly traded. Calculations are performed for Amgen, Boeing, DuPont, Freescale Semiconductor and United Parcel Service. The volatility parameter and dividend rate selected for each of these companies was taken from their 2005 annual reports. The common assumptions for all of these calculations are as follows:

Risk-free Rate of Return: 4.0%
Option Term: 5 years
Long-Term Expected Return: 11.0% (before dividend rates are considered)
Strike Level Current Selling Price The calculated results are shown in the Table 6, FIG. 8. The volatility for Amgen is an average rate for two previous years.

The call option values calculated by the CPM model are markedly lower than the values calculated by the Black-Scholes model. This change would translate into a lower option expense for these corporations.

Due to the disclosure requirements invoked by FASB 123 (R), and the accepted problems with Black-Scholes, companies that issue employee stock options are looking at different methods of valuation of options. Prior to the issuance of FASB 123(R) it was quite common for companies to simply use the Black-Scholes model. However, now Boeing uses a Monte Carlo simulation method, and Amgen uses an implied volatility method which results in an estimate volatility parameter which bears no relationship to actual historical volatility. Other companies have started using binomial or lattice option valuation methods. These alternative methods will often produce a smaller value for employee stock options than would be produced by Black-Scholes. An important factor to consider is whether market quotations have not been overly influenced by Black-Scholes as explained above. In addition, each of the CPM values shown in FIG. 8 could be reduced even further if the values were adjusted by way of parameter z to reflect the premium representing the extra risk that an investor takes when trading in the volatile options market.

While various embodiments of the invention have been described, it will be apparent to those of ordinary skill in the art that may more embodiments and implementations are possible that are within the scope of the invention.

What is claimed is:

1. A computer implemented method of calculating an estimated stock option price given a current stock price, historical prices of the stock, a strike price, a time duration, an estimated volatility, an estimated continuously compounded expected long-term rate of return of the stock, and a current continuously compounded risk-free rate of return, the method comprising the steps of:

computing with a computer a conditional probability volatility parameter using said current continuously compounded expected long-term rate of return, said current continuously compounded risk-free rate of return, and said estimated volatility;

determining a put-call parity adjustment factor to reflect at least one of a current market preference for put options and a current market preference for call options; and calculating a forecasted estimated stock option price using said conditional probability volatility parameter and said put-call parity adjustment factor.

2. The method of claim 1, wherein said step of calculating the estimated stock option price calculates a call option price.

3. The method of claim 1, wherein said step of calculating the estimated stock option price calculates a put option price.

4. A computer implemented system for estimating stock option prices given historical stock prices of the underlying stock, a current stock price, a time duration, a continuously compounded expected long-term rate of return, a risk-free rate of return, an estimated volatility, and a strike price, said system comprising:

means for calculating a conditional probability volatility parameter to maintain a relationship between the volatility parameter and the long-term rate of return parameter;

means for determining a put-call parity adjustment parameter incorporating the continuously compounded risk-free rate of return to reflect at least one of a current market preference for put options and a current market preference for call options; and means for computing a forecasted stock option price.

5. A computer readable medium containing program instructions for execution on a computer system, which when executed by a computer, causes the computer to perform method steps for estimating stock option prices, said method comprising the steps of:

requesting input of a current stock price, a strike price, a time duration, an estimated volatility, an estimated continuously compounded expected long-term rate of return of the stock, and a current continuously compounded risk-free rate of return;

calculating a conditional probability volatility parameter to maintain a relationship between the volatility parameter and the long-term rate of return parameter;

determining a put-call parity adjustment parameter incorporating the continuously compounded risk-free rate of return to reflect at least one of a current market preference for put options and a current market preference for call options; and computing a forecasted stock option price.

6. The medium of claim 5, also containing instructions for maintaining a relationship between the volatility parameter and the long-term rate of return parameter.

7. The medium of claim 6, containing instructions where said method step of computing a stock option price computes a call option price.

8. The medium of claim 6, containing instructions where said method step of computing a stock option price computes a put option price.

9. A stock option price estimate determined by a computer implemented method comprising the steps of:

identifying stock option;

obtaining a current stock price;

obtaining a current strike price;

inputting a time duration;

obtaining an estimated volatility;

obtaining an estimated continuously compounded expected long-term rate of return of the stock;

obtaining a current continuously compounded risk-free rate of return;

calculating with a computer a conditional probability volatility parameter to maintain a relationship between the volatility parameter and the long-term rate of return parameter;

determining a put-call parity adjustment parameter incorporating the continuously compounded risk-free rate of return to reflect at least one of a current market preference for put options and a current market preference for call options;

computing a forecasted stock option price; and outputting computed stock option price.

10. The stock option price estimate determined by a computer implemented method of claim 9, further comprising the step of:

maintaining a relationship between the estimated continuously compounded expected long-term rate of return of the stock and the estimated volatility.

* * * * *